United States Patent [19]
Zortea et al.

[11] Patent Number: 5,493,334
[45] Date of Patent: Feb. 20, 1996

[54] AUTOMATIC DIGITAL BLACK SHADING FOR CAMERAS

[75] Inventors: Anthony E. Zortea, Pipersville, Pa.; Peter Westerink, Mt. Laurel, N.J.

[73] Assignee: Panasonic Technologies, Inc., Secaucus, N.J.

[21] Appl. No.: 420,325

[22] Filed: Apr. 11, 1995

Related U.S. Application Data

[63] Continuation of Ser. No. 170,031, Dec. 20, 1993, abandoned.

[51] Int. Cl.$^6$ .............................. H04N 9/64; H04N 5/217
[52] U.S. Cl. ...................... 348/243; 348/251; 348/241; 382/274
[58] Field of Search ...................... 348/241, 243, 348/250, 251, 207, 246; 382/274, 275; H04N 5/335, 5/217

[56] References Cited

U.S. PATENT DOCUMENTS

| | | | |
|---|---|---|---|
| 4,285,004 | 8/1981 | Morrison et al. | 348/251 |
| 4,599,640 | 7/1986 | Dischert | 348/265 |
| 4,663,666 | 5/1987 | Bloom | 348/243 |
| 4,731,652 | 3/1988 | Yamanaka | 348/251 |
| 4,970,598 | 11/1990 | Vogel | 348/251 |
| 5,047,861 | 9/1991 | Houchin et al. | 348/247 |
| 5,272,536 | 12/1993 | Sudo et al. | 348/243 |

FOREIGN PATENT DOCUMENTS

| | | | |
|---|---|---|---|
| 0324925 | 7/1989 | European Pat. Off. | H04N 5/33 |
| 0447187 | 9/1991 | European Pat. Off. | H04N 5/217 |
| 9015501 | 12/1990 | WIPO | H04N 5/217 |
| 9203009 | 2/1992 | WIPO | H04N 5/16 |
| 9305611 | 3/1993 | WIPO | H04N 5/14 |

OTHER PUBLICATIONS

European Search Report for Application Number 94118480.6 dated Mar. 28, 1995.

*Primary Examiner*—Michael T. Razavi
*Assistant Examiner*—Tuan V. Ho
*Attorney, Agent, or Firm*—Ratner & Prestia

[57] ABSTRACT

A video camera generates an approximation of the dark current or black shading distortion signals based on scan position in the image, and subtracts the approximation signal from the signal generated by the camera during normal image-sensing operation to reduce the black shading distortion. In a particular embodiment of the invention, counters generate location signals representative of the location of pixel currently being read, and the location signals are processed by functions such as squaring or raising to a constant power, and by weighting, to produce components of the approximation of the dark signal. The components are subtracted from the imager signal, to reduce the dark shading. In one embodiment of the invention, the functions are automatically selected from among a plurality of preselected functions, and implemented by look-up tables.

12 Claims, 7 Drawing Sheets

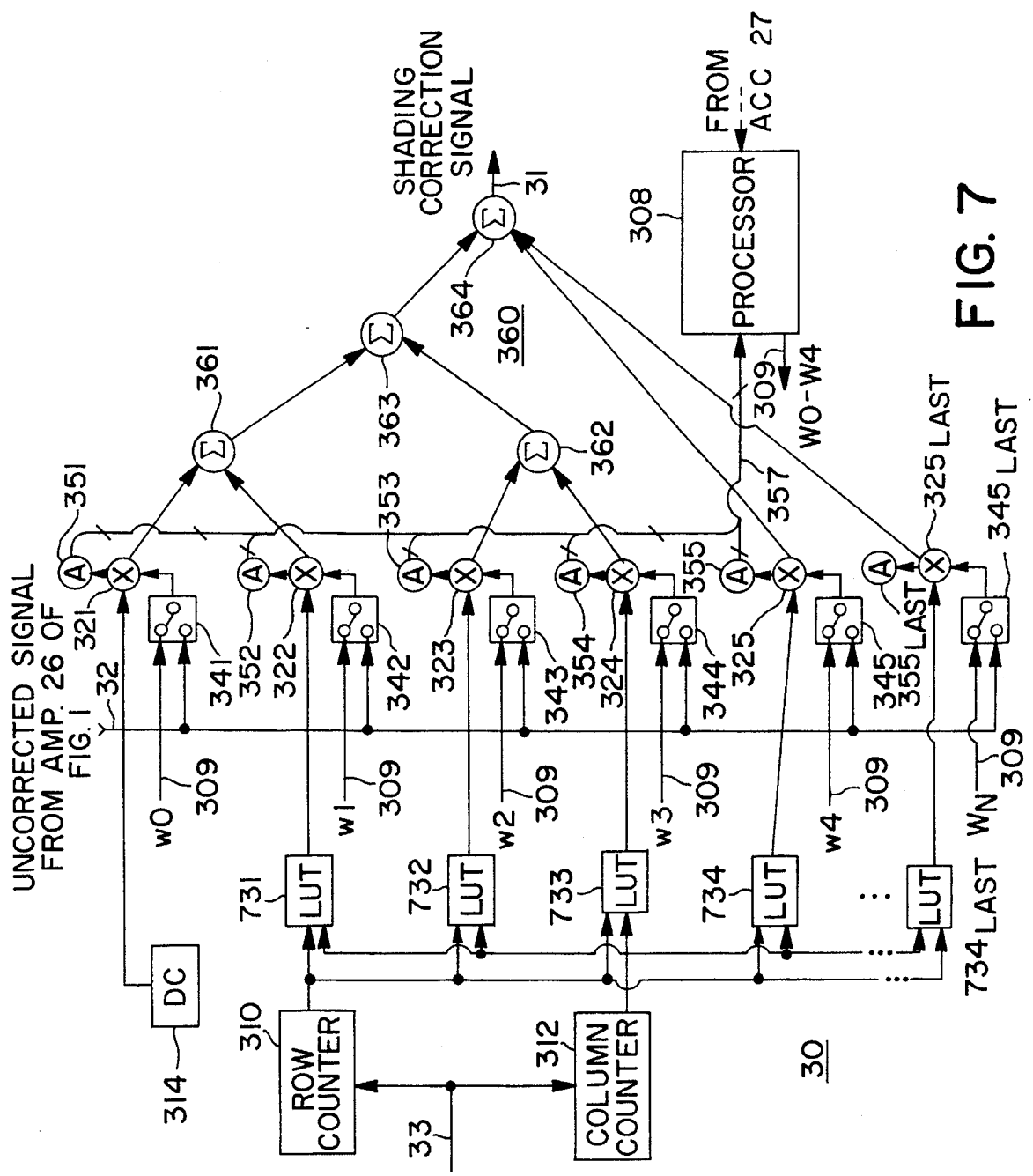

AUTOMATIC DIGITAL BLACK SHADING FOR CAMERAS

This application is a continuation of application Ser. No. 08/170,031, filed Dec. 20, 1993, now abandoned.

BACKGROUND OF THE INVENTION

1. Field of the Invention

This invention relates to television cameras, and more particularly to black shading correction for television cameras.

2. Background of the Invention

Television cameras are in widespread use in a variety of sensing, communication, and scientific applications. With the advent of improvements such as high-definition systems, camera defects will become more apparent to the television viewer. Thus, camera improvements are desirable. One of the defects to which cameras are subject is "dark current" or "black shading", which is current or charge (signal) which arises from the characteristics of the camera imager (the actual photosensitive screen) itself, and which does not depend on the image falling thereon.

The dark signal may be viewed as being the imager signal when a cap is placed on the associated lens to eliminate light from the image. In the context of charge-coupled device (CCD) imagers, the dark current may be viewed as "leakage" which results in charge which accumulates in each picture element (pixel) of the "A" register of the imager during the image integrating interval. Thus, each pixel includes a charge portion attributable to the integration of image information during the integrating interval, and also includes a charge portion attributable to dark current over the same interval.

In general, the pixels of a CCD imager are similar to the other pixels, except in the case of point defects, so the dark signal contribution in each pixel tends to be the same as in the other pixels. Thus, it might be thought that subtraction of a single value of charge from each pixel might be sufficient to correct for the presence of dark current. However, charge is read from the pixels of the A register of a CCD imager by moving columns of pixel information simultaneously along the A register into a "B" register, where the information is stored for further processing. During the transfer of charge from the A register to the B register, dark current continues to accumulate in the pixels, with the result that those pixels which dwell in the A register for the longest period of time tend to accumulate more charge from the dark current than those which dwell for a lesser time. Thus, the "upper" pixels, which must traverse the entire A register during the charge transfer "pull-down" period before arriving at the B storage register, accumulate more charge from the dark current than those at the bottom of the A register, which arrive at the B register earlier.

This effect causes a "shading" across the imager, which in principle requires a ramp-like correction signal to be subtracted from the imager signal, with the ramp waveform applied in each column of read-out image information, from bottom to top of the image, for correction thereof. A parabolic correction waveform is sometimes necessary. A further correction waveform may be necessary along each row, in which case the correction waveforms are summed to produce the total correction waveform to be subtracted from the imager signal.

In the case of vacuum-type imaging tubes, the photosensitive screen is subject to dark signal variations attributable to such conditions as slight thickness variations of the photosensitive material across the screen, variations in its conductivity, or in the interface between the material and the underlying substrate. Thus, the dark signal correction required in a tube-type imager may be more complex than that required in a CCD imager.

SUMMARY OF THE INVENTION

A camera generates an approximation of the dark current or black shading, and subtracts the approximation signal from the signal generated by the camera during normal image-sensing operation. In a particular embodiment of the invention, counters generate location signals representative of the pixel currently being read, and the location signals are processed by functions such as multiplication and/or squaring, and by weighting, to produce components of the approximation of the dark signal. The components are subtracted from the imager signal, to reduce the dark shading. In one embodiment of the invention, the functions are automatically selected from among a plurality of preselected functions, and implemented by look-up tables.

DESCRIPTION OF THE DRAWINGS

FIG. 7 is a simplified block diagram of a further alternative correction signal generator which may be used in the arrangement of FIG. 1 instead of the arrangement of FIG. 3.

DESCRIPTION OF THE INVENTION

Figure 1:
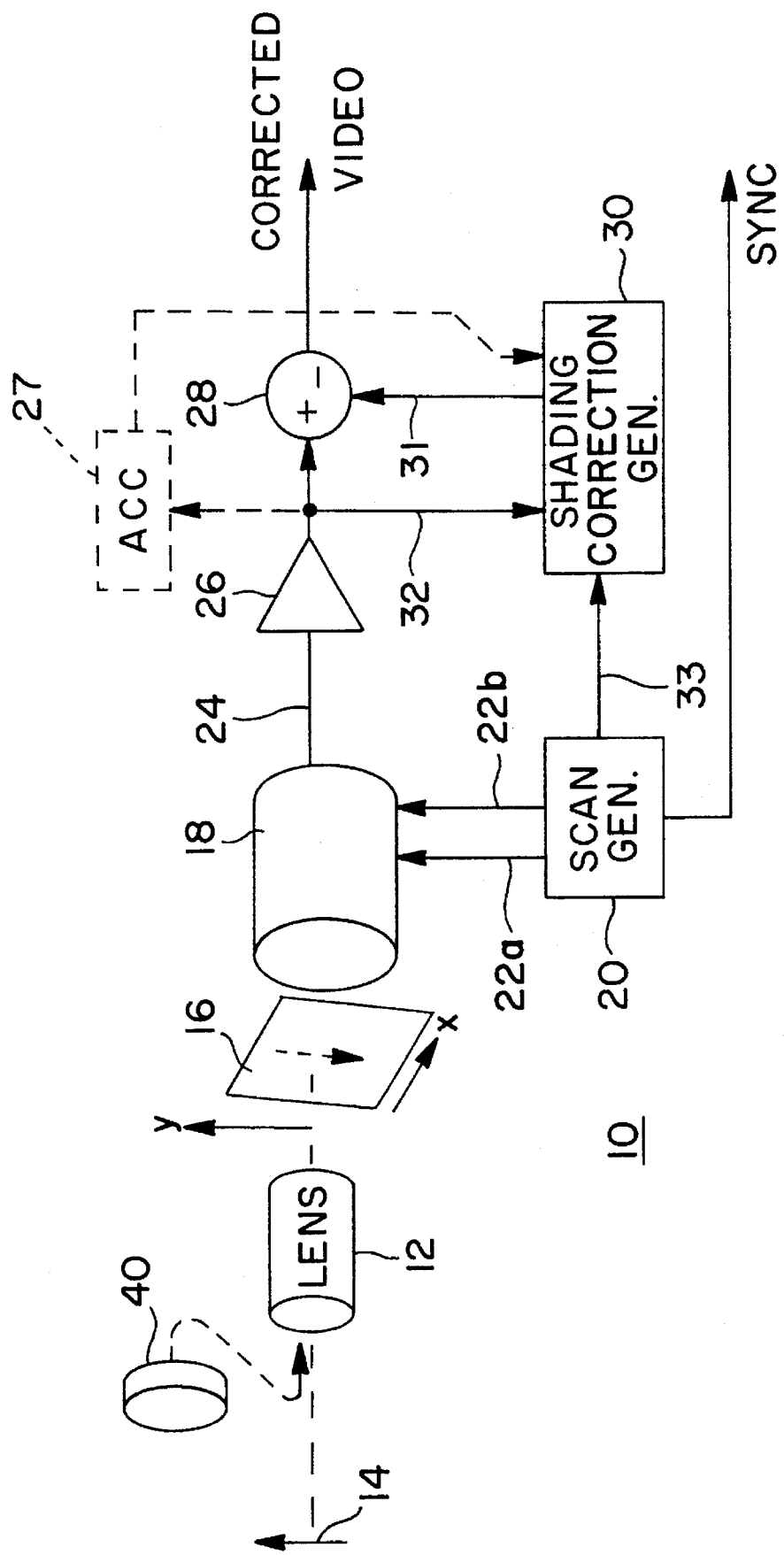
FIG. 1 is a simplified block diagram of a camera according to the invention.

FIG. 1 is a simplified block diagram of a monochromatic camera 10, which may also be considered to be one imager of a multiimager color camera. In FIG. 1, a lens 12 focuses an image represented by an arrow 14 onto the surface of an imager 16, which is associated with horizontal x and vertical y axes. The imager 16 may be either a vacuum tube-type device such as a saticon or plumbicon imaging device or it may be a semiconductor device using charge coupled devices (CCD's) or bucket brigade devices. An image readout arrangement illustrated as a cylindrical object 18 is associated with the imager 16, for reading charge or current from the imager, under the influence of a scan control generator 20 and its coupling 22a, 22b to image readout arrangement 18, and for producing signal representative of the image (and its associated dark signal) on an output signal path 24.

Those skilled in the art know that, as scan generator 20 of FIG. 1 operates, readout device 18 reads across screen 16 in rows parallel to the x axis, with each successive row closer to the bottom (or top) of screen 16, until the entire screen (or at least the active portion thereof) has been read. Scan generator 20 may operate continuously, reading signal from one part of the photosensitive screen while light is integrated on the remainder of the screen.

The signals produced from the screen by readout device 18 of FIG. 1 are applied to a preamplifier 26 for low-noise amplification, and are applied from the output of amplifier 26 to the noninverting (+) input port of a summing circuit 28. A shading correction generator 30 is coupled by a path 33 to scan generator 20 for receiving information relating to the row and column of the pixel currently being read, and for generating a shading correction signal, as described below.

The output signal produced by the preamplifier 26 may also be applied to an optional accumulator 27 (shown in phantom). As described below, the accumulator 27 provides a measure of the effectiveness of a given correction function. When the accumulator 27 is used, the system can automatically select the correction function that will be used from among a group of possible functions. Without the accumulator 27 or some other apparatus for developing an objective measure of quality, function selection would be guided by a human operator.

The shading correction signal relating to the pixel currently being read from screen 16 of FIG. 1 is applied over a signal path 31 to the inverting (−) input port of summing circuit 28, for subtraction of the correction signal from the signal representing the current pixel, to thereby produce a video signal corrected for dark signal.

The corrected video signal produced by camera arrangement 10 of FIG. 1 is made available for other processing, which may include, for example, correction for geometric distortions of various sorts, color balance correction and aperture correction. The camera output signals include the corrected video signal, and a synchronization signal (sync) from scan generator 20, which may be combined with the video signal at later processing stages.

FIG. 1 also illustrates a lens cap 40, which may be placed over lens 12 to prevent light from entering the lens and falling onto photosensitive screen 16. With the lens cap in place on lens 16, any signal produced on output signal path 24 must be dark signal.

Figure 2A:
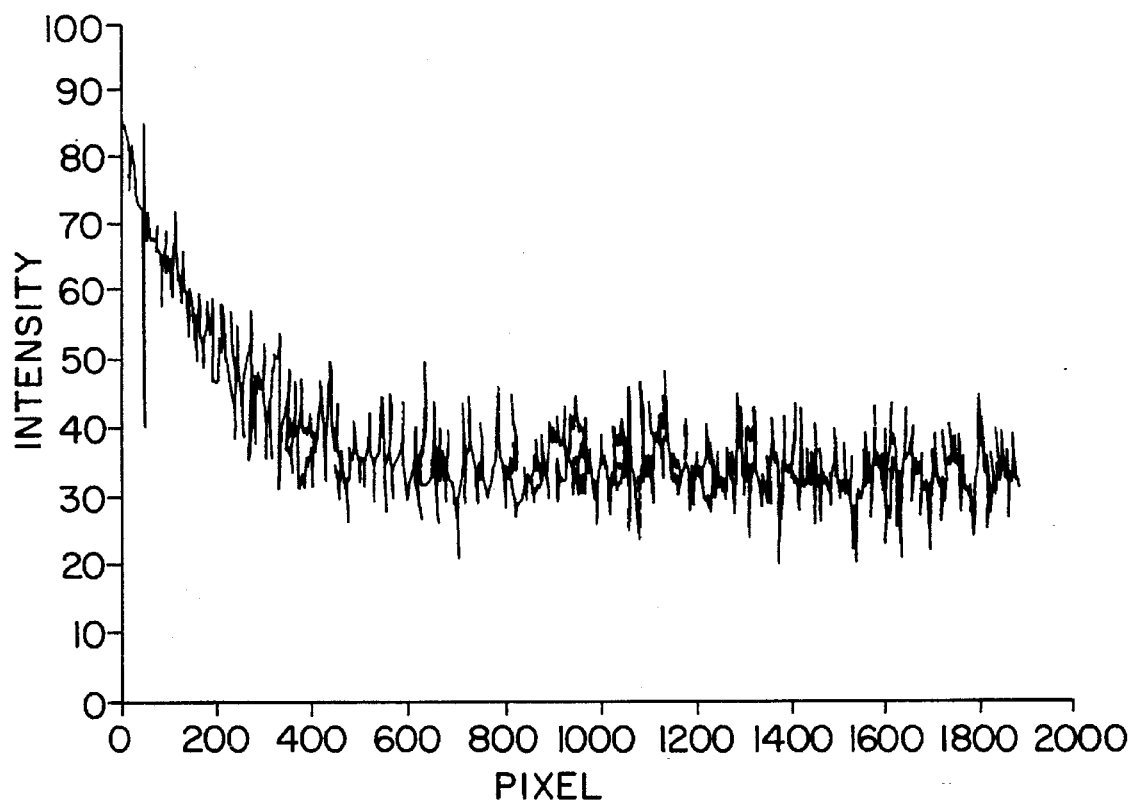
FIGS. 2a and 2b are plots of the dark signal of an imager in the horizontal and vertical directions, respectively.
Figure 2B:
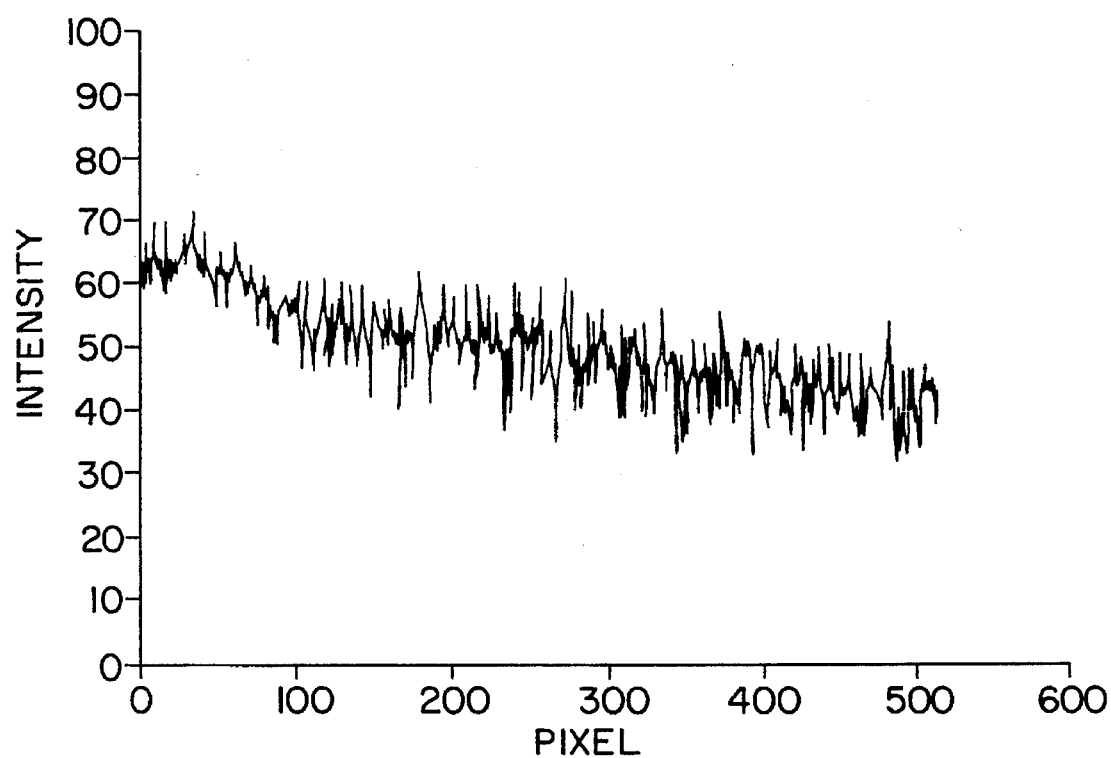

It is difficult to represent the shading across a two-dimensional screen as a two-dimensional drawing. A two-dimensional FIGURE, however, can easily represent the variation of shading in one dimension. FIG. 2a illustrates the uncorrected dark signal from the 200$^{th}$ row of a representative imager, and FIG. 2b is a plot of the uncorrected dark signal from the 200$^{th}$ column. To aid in clearly seeing the signal, a constant offset value of thirty-two intensity units has been added to the actual signal intensity in FIGS. 2a and 2b, and also in FIGS. 4a, 4b, 6a and 6b. In FIGS. 2a and 2b, it can be seen that the two-dimensional dark signal function is complex, and not amenable to correction by a simple waveform such as a ramp or a parabola.

Figure 3:
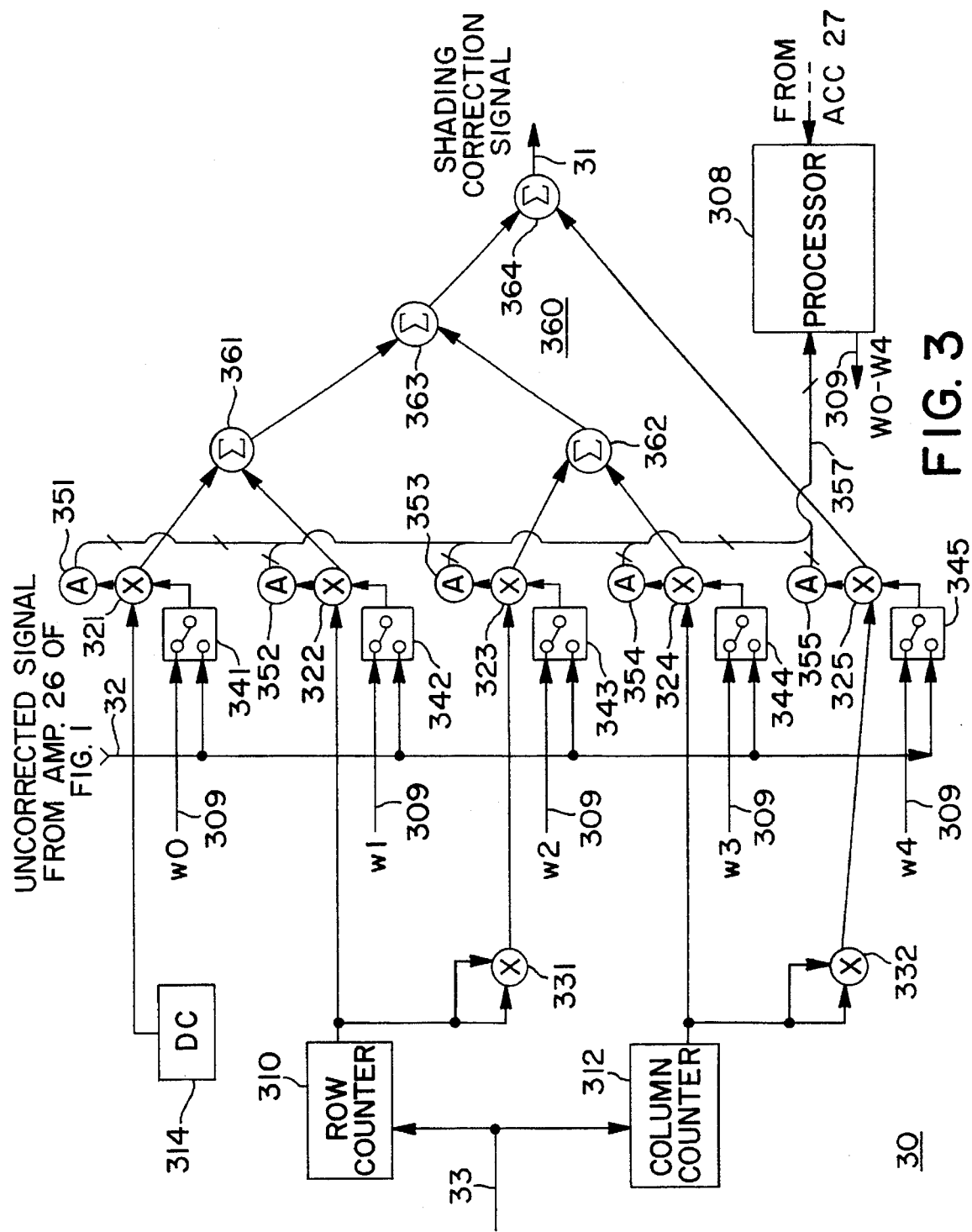
FIG. 3 is a simplified block diagram of a correction signal generator which may be used in the arrangement of FIG. 1.

As illustrated in FIG. 1, the uncorrected signal is applied to shading correction signal generator 30 by a signal path 32. FIG. 3 is a simplified block diagram of one embodiment of shading correction generator 30. In FIG. 3, elements corresponding to those of FIG. 1 are designated by like reference numerals. In FIG. 3, a row counter 310 receives, from scan generator 20 of FIG. 1 by way of signal path 33, information relating to the row number currently being read. The information may simply be a pulse occurring at a defined point along the scan, such as at the beginning or end of a row, and row counter 310 may be simply an accumulator, in which the current count represents the current row. Similarly, a column counter 312 receives information relating to the scanning, and counts each pixel along a row. In the ordinary scanning arrangement, column counter 312 counts at a much higher rate than row counter 310. Thus, in the usual arrangement, column counter 312 may count five hundred or more pixels in the first row of "image" information read from the screen, and then is reset to zero by the end-of-row pulse, to count a like number for the second row of image information, continuing in a like manner to count in a horizontal (H) direction until all rows have been accounted for. Similarly, the row counter counts in the vertical (V) direction, and may be reset to zero count at the end of a field or frame, as appropriate.

The counts produced by row counter 310 and column counter 312 of FIG. 3 together constitute two variable signals which are inputs to the remainder of the correction signal arrangement of FIG. 3. A third input is a constant-value input from direct current (DC) source or generator 314, for reasons described below. Weighting input signals $w_0$, $w_1$, $w_2$, $w_3$, $w_4$ are also received over a weighting data bus 309. The DC signal from generator 314 is applied to an input port of a first multiplier 321. The row count is applied to an input port of a second multiplier 322 and to both input ports of a further multiplier 331. The column count from counter 312 is applied to the input port of a multiplier 324 and to both input ports of a further multiplier 332. Further multiplier 331 receives the row count at both its input ports, and multiplies the row count by itself to generate a row squared count equal to the square of the row count. The row count squared signal is applied from multiplier 331 to an input port of a multiplier 323. Similarly, further multiplier 332 receives the column count at both its input ports to generate a column count squared signal equal to the square of the column count. The column count squared signal is applied from multiplier 332 to an input port of a multiplier 325.

As also illustrated in FIG. 3, a weight signal (weight) $w_0$ is applied from a processor 308 by way of a weighting data bus 309, and by way of a single-pole, double throw switch 341 (in the illustrated switch position) to a further input port of multiplier 321, and weights $w_1$, $w_2$, $w_3$, and $w_4$ are applied, by way of bus 309 and switches 342, 343, 344 and 345, respectively, to further input ports of multipliers 322, 323, 324, and 325, respectively.

The multiplied or product output signal of each multiplier 321, 322, 323, 324, and 325 is applied to the input port of a corresponding accumulator (A) 351, 352, 353, 354, and 355, respectively, and the accumulated signals are applied over a data path 357 to control processor 308, to aid in generating the weights. The product signals at the outputs of multipliers 321, 322, 323, 324, and 325 are summed together by a network 360 of summing circuits, including summing circuits 361, 362, 363, and 364, to produce the desired shading correction signal on signal path 31. More particularly, the output product signals from multipliers 321 and 322 are applied to a summing circuit 361, and the output product signal from multipliers 323 and 324 are summed together in a summing circuit 362. The summed signals from summing circuits 361 and 362 are applied to a summing circuit 363, the summed output of which is applied to a further summing circuit 364, in which they are added to the output signal from multiplier 325.

The arrangement of FIG. 3 also includes uncorrected signal path 32, which carries uncorrected signals from preamplifier 26 of FIG. 1 to the second throws of switches 331–335 (where the hyphen represents the word "through"). In the illustrated positions of switches 341–345, the uncorrected signal is not used in the arrangement of FIG. 3.

In normal operation of the camera of FIG. 1 with the correction waveform generator 30 as illustrated in FIG. 3, a constant component of the shading correction signal is generated by multiplication, in multiplier 321, of DC from generator 314 by the value of weight $w_0$. This constant value is determined, in a manner described below, to compensate for the constant component of the dark signal. This component corresponds, for example, with an intensity value of about 32 in FIG. 2a, if the offset value appearing therein were due to the imager rather than to an intentional offset. Also during normal operation, a ramp-like compensation signal component in the vertical or y direction is generated in multiplier 323 by the multiplication of the row count by weight $w_2$.

Similarly, a ramp-like compensation signal component in the horizontal or x direction is generated in multiplier 324 by multiplying the column count by weight $w_3$. Parabolic correction waveforms in the y and x directions are generated in multipliers 323 and 325, respectively, by multiplying the row squared and column squared signals produced by multipliers 331 and 332, respectively, by weights $w_3$ and $w_5$, respectively. Thus, a constant correction signal component, and vertical-and horizontal-direction ramp and parabolic correction signal components, are generated at the outputs of multipliers 321–325, with amplitudes which are independently controllable by the magnitudes of the weights. The components are summed together by summing arrangement 360, and applied over path 31 to the inverting input port of summing circuit 28 of FIG. 1, to be subtracted from the uncorrected signal to thereby produce the corrected signal.

A correction signal which compensates for the particular dark current function of the imager 16 may be generated automatically as disclosed below.

The correction signal is estimated by a least-squares procedure. In the general theory of least-squares estimation, let $d(x)$ be a function to be modeled by $f(x)$, where $f(x)$ is defined by equation (1).

$$f(x) = w_0 f_0(x) + w_1 f_1(x) + \ldots + w_{N-1} f_{N-1}(x) = \sum_{i=0}^{N-1} w_i f_i(x) \quad (1)$$

where: x is an input vector; and $w_0, w_1, \ldots w_{N-1}$ are weights which cause $f(x)$ to model $d(x)$;

Least-squares estimation finds the set of $w_i$ (or the vector w) that satisfies equation (2).

$$\min_{w} \sum_x (d(x) - f(x))^2 \quad (2)$$

The extreme values, or extrema, of a multidimensional function are found when the partial derivatives of the function are zero, satisfying equation (3).

$$\frac{\delta}{\delta w_i} \left( \sum_x (d(x) - f(x))^2 \right) = 0 \quad i = 0, 1, \ldots (N-1) \quad (3)$$

Combining equations (1) and (3), we obtain equation (4).

$$\sum_x d(x) f_i(x) = \sum_x f(x) f_i(x) \quad i = 0, 1, \ldots (N-1) \quad (4)$$

Which leads to the matrix equation (5).

$$\begin{bmatrix} d(x)f_0(x) \\ d(x)f_1(x) \\ \ldots \\ d(x)f_{N1}(x) \end{bmatrix} = \left[ \Sigma \left[ \begin{bmatrix} f_0(x) \\ f_1(x) \\ \ldots \\ f_{N1}(x) \end{bmatrix} [f(x)f_0(x) \ldots f_{N1}(x)] \right] \right] \cdot \begin{bmatrix} w_0 \\ w_1 \\ \ldots \\ w_{N1} \end{bmatrix} \quad (5)$$

where $N1 = N-1$. Using matrix notation, equation (5) becomes equation (6).

$$d = Fw \quad (6)$$

Since we are only interested in w, it is only necessary to find the inverse of F, whereupon the weighting factors w may be determined as shown in equation (7).

$$w = F^{-1} d \quad (7)$$

In order to apply the above theory to correction of dark signal, $d(x)$ is the dark signal to be modeled, where the vector x is given by equation (8).

$$x = [h_{pos}, v_{pos}, \text{frame}] \quad (8)$$

In this instance, the correction signal, that is to say the signal that is combined with the image to compensate for the signal $d(x)$, is the signal $-f(x)$. To find the weighting factors, w, of the correction image, we must find $F^{-1}$ and d and compute their product. Note that $F^{-1}$ is independent of $d(x)$, but is dependent on the function $f(x)$ chosen for the model. Thus, $F^{-1}$ can be calculated "off-line" based on the selected modeling function $f(x)$. Only the d vector, namely $d(x)f_i(x)$, must be computed "on-line". In summary, the procedure for calculating the weights includes the steps of:

(a) select the modeling functions $f_i(x)$;
(b) compute $F^{-1}$ off-line using equations (5) & (6);
(c) measure the d vector on-line, by $d(x)f_i(x)$;
(d) using equation (7), compute the weights.

The weights are established in the arrangement of FIGS. 1 and 3 by throwing switches 341–345 to their alternate positions (i.e. passing the uncorrected signal), and capping the lens. The uncorrected dark signal is then applied to one port of each of multipliers 321–325 instead of the weights $w_0$–$w_4$. This has the effect of multiplying the dark signal by the constant, ramp or parabolic inputs, which are based on the position of the pixel in the image.

For example, the constant DC input from generator 314 is multiplied in multiplier 321 by the dark signal at each pixel, and the product for each pixel is applied to accumulator 351. Accumulator 351 accumulates the product signal from multiplier 321 over an entire field, frame or a plurality of frames. The resulting accumulation is a representation of the constant component of the dark signal, as modified by the constant value from DC generator 314. Similarly, multipliers 322 and 324 multiply the dark signal by vertical- and horizontal-direction ramps, respectively, and accumulators 352 and 354 accumulate their respective product signals for all pixels of the field or the selected number of frames.

Multipliers 323 and 325 of FIG. 3 multiply the dark signal by vertical- and horizontal-direction parabolic signals, respectively, and accumulators 353 and 355 accumulate the resulting product signals, corresponding to $d(x)f_i(x)$. The accumulated signals are read from accumulators 351–355 by way of data paths of bus 357 to processor 308, which performs the calculation of weights $w_0$–$w_4$ from the accumulated signals, using equation (7) in accordance with the above description. Thereafter, the lens cap is removed, switches 341–345 are thrown to their illustrated positions to apply the weights to multipliers 321–325, and normal operation may proceed.

Figure 4A:
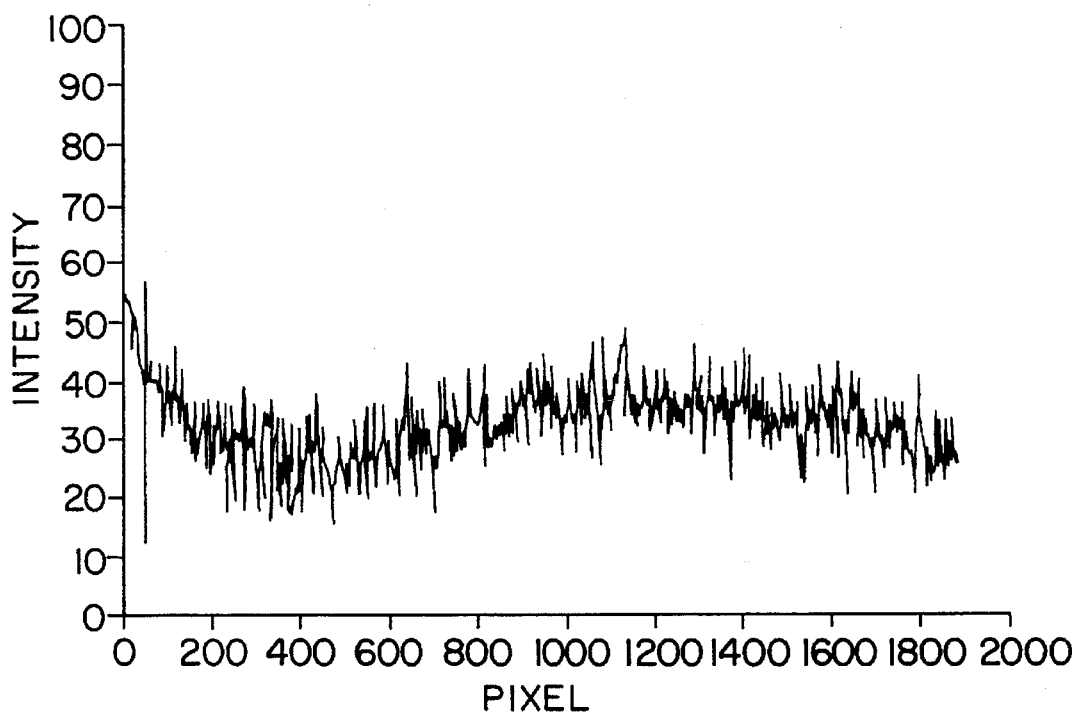
FIGS. 4a and 4b are plots of the dark signal corresponding to those of FIGS. 2a and 2b, corrected by the arrangement of the invention with a first correction function.

FIG. 4a is a plot of the 200$^{th}$ row of a dark signal image of the imager which made the plots of FIGS. 2a and 2b, corrected by the above described apparatus, corrected by the correction function f(h,v) given in equation (9).

$$f(h,v)=w_0+w_1h+w_2h^2+w_3v+w_4v^2 \qquad (9)$$

Figure 4B:
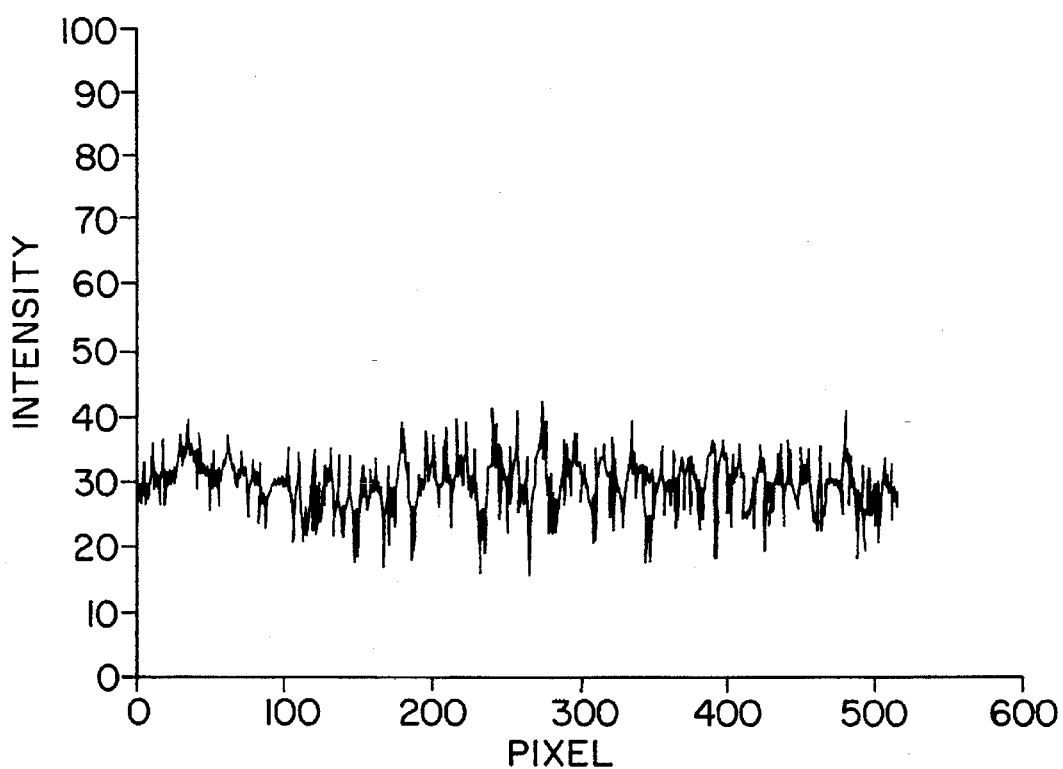

FIG. 4b is a corresponding plot of the 200$^{th}$ column, corrected by the same function f(h,v) as for correction of the column. Comparison of the plots of FIGS. 4a and 4b with the uncorrected plots of FIGS. 2a and 2b, respectively, shows that there is a correction, but that the correction is incomplete, thereby suggesting that the selected correction function, f, might advantageously include additional or different terms.

Figure 5:
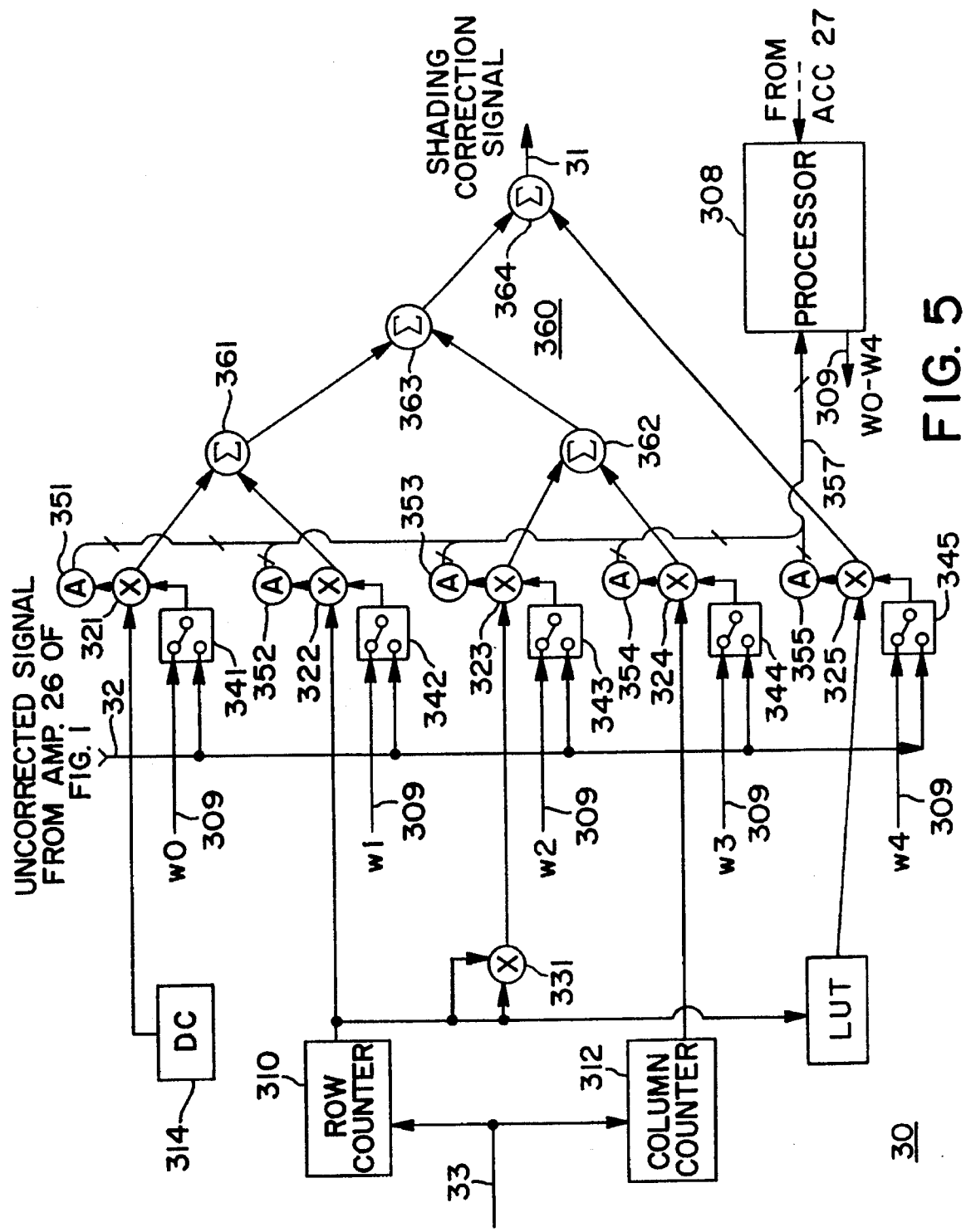
FIG. 5 is a simplified block diagram of an alternative correction signal generator which may be used in the arrangement of FIG. 1 instead of the arrangement of FIG. 3.

FIG. 5 is a simplified block diagram of a portion of a correction signal generator according to the invention, which implements a function f(h,v) given by equation (10).

$$f(h,v)=w_0+w_1h+w_2e^{-10v}+w_3v+w_4v^2 \qquad (10)$$

different from the function produced by correction signal generator of FIG. 3. Elements of FIG. 5 corresponding to those of FIG. 3 are designated by like reference numerals. In FIG. 5, the constant value signal from DC generator 314 is applied to multiplier 321 for multiplication by weight $w_0$, the row signal from row counter 310 is applied to multiplier 322 for multiplication by weight $w_2$, the row signal is applied to both input ports of a multiplier 331 for squaring, and the column signal from column counter 312 is applied to multiplier 324 for multiplication by weight $w_3$, just as in the arrangement of FIG. 3. Unlike the arrangement of FIG. 3, the row signal from row counter 310 of FIG. 5 is applied to a memory arrangement 532, arranged as a random-access look-up table (LUT), which is preprogrammed with values implementing the $e^{-10v}$ component of equation 10. LUT 532 may be a preprogrammed read-only memory (ROM), but is preferably a nonvolatile reprogrammable random-access memory (RAM). The $v^2$ component from multiplier 531 is applied to multiplier 323 for multiplication by weight $w_2$, and the $e^{-10v}$ component from LUT 532 is applied to multiplier 325, for multiplication by weight $w_4$.

Figure 6A:
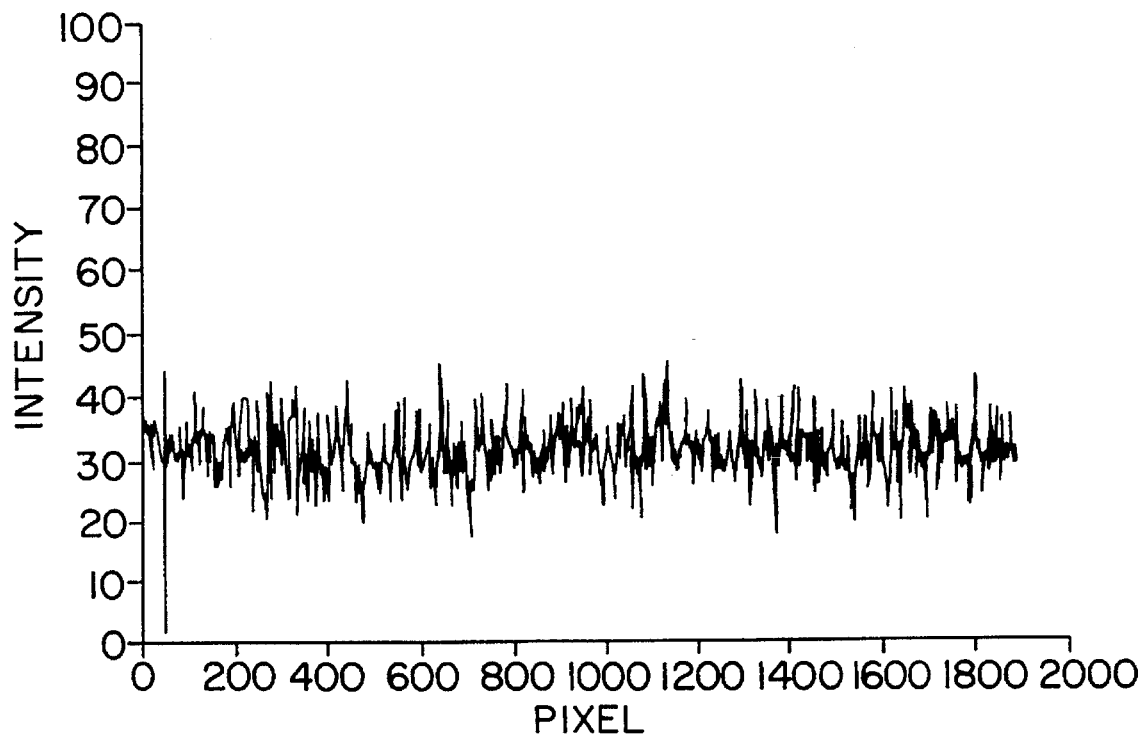
FIGS. 6a and 6b are plots of the dark signal corresponding to those of FIGS. 2a and 2b, corrected by the arrangement of the invention with a second correction function.
Figure 6B:
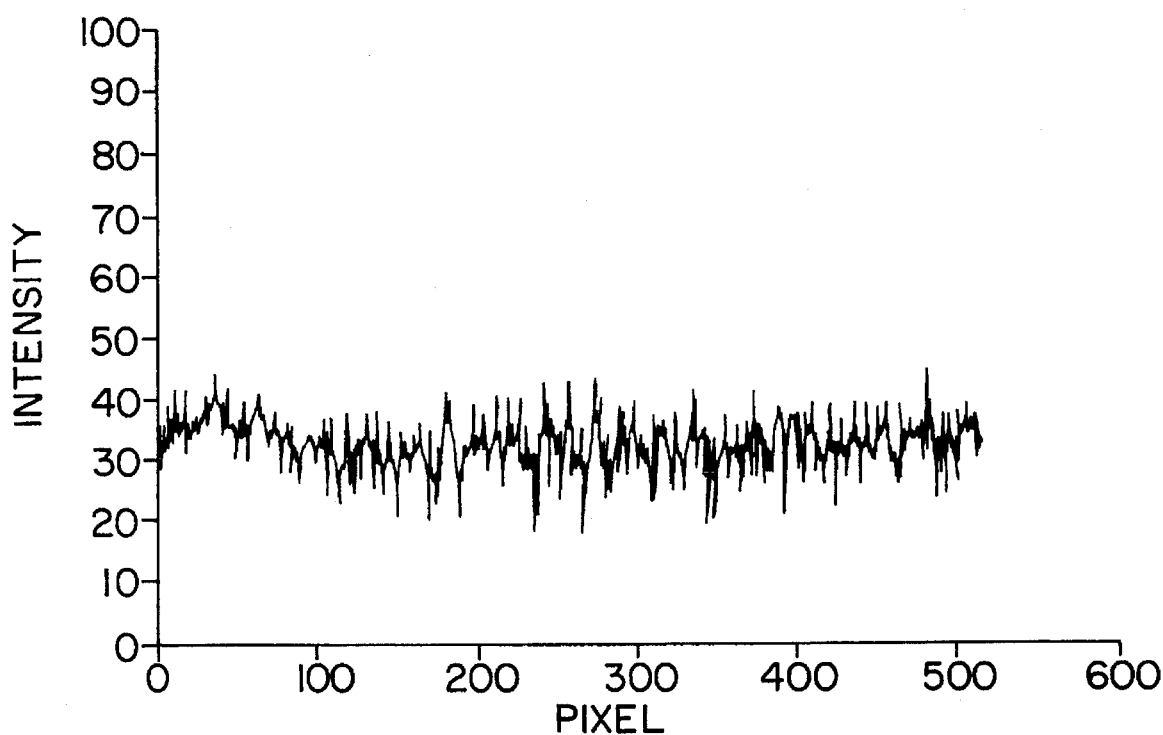

FIGS. 6a and 6b are plots of the 200$^{th}$ row and column of the corrected dark signal, respectively, where the correction function, f(h,v), is given by equation (10)

As illustrated, the correction is improved over that of FIGS. 4a and 4b.

FIG. 7 is a simplified block diagram of a portion of a correction signal generator according to the invention, which is capable of generating the same functions as those of the arrangements of FIGS. 3 and 5, and other functions. Elements of FIG. 7 corresponding to those of FIG. 3 are designated by like reference numerals. In FIG. 7, the row and column count signals from row counter 310 and column counter 312 are applied as input addresses to each of LUTs 731, 732, 733, 734 and 734$_{LAST}$. Each LUT is preprogrammed with information relating the count to a particular function, as described above in relation to LUT 532. The resulting count-related functions are applied from LUTs 731–734$_{LAST}$ to corresponding ones of multipliers 322–325$_{LAST}$. LUT memories 731–734$_{LAST}$ need not be full frame memories, but may have a limited depth in that bits of lesser significance are not recorded, whereby that the amplitude quantization is coarse relative to the quantization (number of bits) representing the signal, and/or may have the addresses similarly limited to bits of greater significance, which results in treating "blocks" of two, four, eight . . . N mutually adjacent pixels in the same manner. Thus, memory LUTs 731–734$_{LAST}$ may be relatively small, if desired. Naturally, the memories of LUTs 731–734$_{LAST}$ may be different portions or pages of a common memory structure.

During dark current compensation setup, controller or processor 308 of the arrangement of FIG. 7 may sequentially select each of several preselected functions, such as the functions of equations 9 and 10, previously stored in nonvolatile memory. The setup process may include the sequential steps of (a) set the weights to zero, (b) run one field or frame and read the accumulator outputs, (c) load the first selected function into LUT, (d) for the first selected function, determine and record the weights using the accumulator outputs, (e) set the weights according to the determination, (f) read a dark image from the imager 16, and (g) read and record the value held in the optional accumulator 27 after the dark image has been read. Steps (a) through (g) are repeated for each of the second, third . . . last of the stored functions. When all the stored functions have been processed, those functions (and their corresponding weights) are selected for use which resulted in the lowest value from accumulator 27.

The arrangement of the invention provides automatic dark signal correction without the large memory requirements of the prior art, and which can adapt to changes in the dark current caused by aging and other factors.

Other embodiments of the invention will be apparent to those skilled in the art. For example, shading correction summer 28 of FIG. 1 may precede preamplifier 26, if desired, rather than following it.

The invention claimed is:

1. A video camera, comprising:

an imager, for, when scanned, producing image signals representative of a matrix of picture elements (pixels) which constitute an image, said imager undesirably adding black signal to said image signals, which tends to produce shading of the image;

scanning means coupled to said imager, for scanning said line-scan imager ill response to vertical and horizontal control signals and for accessing each of a plurality of pixel positions in the image to provide said image signal representing said pixels;

location determining means coupled to said scanning means for generating location signals representative of the position of that pixel currently being scanned;

an accumulation register, coupled to receive a sequence of black signal values each value representing a combination of the location signals and the instantaneous image signal as the imager is scanned in a mode in which the black signal is produced to the relative exclusion of any other signal, for accumulating the first and second black signal values;

processing means, coupled to receive only the accumulated first and second black signal values for estimating respective first and second arithmetic functions of only the location signals which, when applied to the pixels produced by the imager, reduce the black signal component of the image signals;

first operating means coupled to said location determining means for operating on said location signals by the estimated first arithmetic function to thereby produce a first correction signal component;

second operating means coupled to said location determining means for operating on said location signals by the estimated second arithmetic function to thereby produce a second correction signal component; and summing means coupled to said imager and to said first and second operating means for combining said first and second correction signal components with said image signal, to reduce said black signal relative to other components of the image signals.

2. A video camera according to claim 1, wherein:

the processing means includes means for generating values representing at least one of the first and second estimated arithmetic functions over a range of possible input values representing location signals and for generating a lookup table which translate the input values into output function values at least one of said first and second operating means comprises the look-up table programmed to implement said at least one of the first and second estimated arithmetic function, respectively.

3. A video camera, comprising:

an imager, for, when scanned, producing image signals representative of a matrix of picture elements (pixels) which constitute an image, said imager undesirably adding black signal to said image signals, which tends to produce shading across the image;

scanning means coupled to said imager, for vertically and horizontally scanning said line-scan imager in response to vertical and horizontal control signals, respectively to produce signal values representing each pixel position in the image;

means, coupled to receive the pixel position signals and to receive each pixel as the imager is scanned in a mode in which the black signal is produced to the relative exclusion of any other signal, for accumulating black signal values representing respective first and second black signal functions applied only to the pixel position signals and the pixel values;

processing means, coupled to receive the accumulated black signal values for estimating an arithmetic function of only the location signals which, when applied to the pixels produced by the imager, reduces the black signal component of the image signals;

constant dark signal correction component signal generating means for generating a constant dark signal correction component, the amplitude of which is responsive to a first weighting signal said constant dark signal correction component representing a first component term of the estimated function;

vertical monotonic dark signal correction component generating means for generating a monotonically changing dark signal correction component responsive to said vertical scanning of said imager, and having an amplitude which is responsive to a second weighting signal said vertical monotonic dark signal correction component representing a second component term of the estimated function;

horizontal monotonic dark signal correction component generating means for generating a monotonically changing dark signal correction component responsive to said horizontal scanning of said imager, and having an amplitude which is responsive to a fourth weighting signal said horizontal monotonic dark signal correction component representing a third component term of the estimated function;

vertical power dark signal correction component generating means for generating a monotonically changing power dark signal correction component responsive to said vertical scanning of said imager, and having an amplitude which is responsive to a third weighting signal said vertical power dark signal correction component representing a fourth component term of the estimated function;

horizontal power dark signal correction component generating means for generating a monotonically changing power dark signal correction component responsive to said horizontal scanning of said imager, and having an amplitude which is responsive to a fifth weighting signal said horizontal power dark signal correction component representing a fifth component term of the estimated function; and summing means coupled to said imager, to said constant dark signal correction component signal generating means, said vertical monotonic dark signal correction component generating means, said horizontal monotonic dark signal correction component generating means, said vertical power dark signal correction component generating means, and said horizontal power dark signal correction component generating means, for subtracting said constant dark signal correction component signal, said vertical monotonic dark signal correction component, said horizontal monotonic dark signal correction component, said vertical power dark signal correction component, and said horizontal power dark signal correction component from said image signals.

4. A camera according to claim 3, wherein:

said vertical monotonic dark signal correction component generating means comprises row counting means coupled to said scanning means for generating a vertical ramp signal which increases in response to the vertical scanning of the pixel positions by the scanning means; and said horizontal monotonic dark signal correction component generating means comprises column counting means coupled to said scanning means for generating a horizontal ramp signal which increases in response to the horizontal scanning of the pixel positions by the scanning means.

5. A camera according to claim 4, wherein:

said vertical power dark signal correction component generating means comprises vertical multiplying means coupled to said row counting means for multiplying said vertical ramp signal by itself for generating a vertical power signal dependent upon the vertical position of the pixel currently being scanned on said imager.

6. A camera according to claim 4, wherein:

said horizontal power dark signal correction component generating means comprises horizontal multiplying means coupled to said column counting means for multiplying said horizontal ramp signal by itself for generating a horizontal power signal dependent on the horizontal position of the pixel currently being scanned on said imager.

7. A camera according to claim 4, wherein:

said vertical power dark signal correction component generating means comprises a first preprogrammed look-up table coupled to said row counting means for being addressed by said vertical ramp signal for generating a vertical power signal dependent upon the vertical position of the pixel currently being scanned on said imager.

8. A method for generating an image-representative signal, comprising the steps of:

scanning said imager in a line-scan manner by rows and columns, whereby said image-representative signal represents successive picture elements (pixels) occupying respective positions in said image;

generating pixel location signals representative of the row and column location of the pixel currently being scanned;

imaging a dark image with said imager subject to dark signal, for producing an image-representative signal representing the dark signal to the substantial exclusion of any other signal component;

accumulating, in a register, values, representing respective functions of the instantaneous values of the image-representative signal and the respective horizontal and vertical pixel location signals to provide respective horizontal and vertical accumulated values;

estimating, responsive only to the horizontal and vertical accumulated values, first and second weighting values;

imaging the image with the imager, to produce the image-representative signal contaminated by the dark signal;

processing one of said row and column pixel location signals by an arithmetic process to produce an unweighted first component of a correction signal;

processing the other one of said row and column pixel location signals by an arithmetic process to produce an unweighted second component of said correction signal;

weighting said first and second unweighted components of said correction signal using the respective first and second weighting values to produce said first and second components of said correction signal;

combining said image-representative signal with said first and second components of said correction signal in a manner which tends to correct said dark signal.

9. A method according to claim 8, wherein at least one of arithmetic processing steps includes the step of raising an input value to a constant power.

10. A method according to claim 9, wherein said step of raising an input value to a constant power comprises the step of squaring.

11. A method according to claim 8, wherein at least one of said arithmetic processing steps includes the step of raising a constant to a power which is dependent upon one of said location signals.

12. Apparatus suitable for use in a video camera which includes an imager that is scanned horizontally across columns of a matrix of pixel positions and vertically across rows of a matrix of pixel positions to produce an output image signal representing image content at the respective pixel positions, the image signal being subject to undesirable black signal distortion which tends to produce shading of the image, said apparatus comprising:

a vertical accumulation register which accumulates values representing a function of the instantaneous values of said image signal and respective pixel positions corresponding to the instantaneous values as the pixel positions are scanned during the vertical scan to provide a vertical accumulated value;

means, responsive only to the vertical accumulated value, for generating vertical correction signals which change according to first predetermined functions of the vertical pixel position and which approximate respective vertical components of the black signal distortion;

a horizontal accumulation register which accumulates values representing a function of the instantaneous values of said image signal and respective pixel positions corresponding to the instantaneous values as the pixel positions are scanned during the horizontal scan to provide a horizontal accumulated value;

means, responsive only to the horizontal accumulated value, for generating horizontal correction signals which change according to second predetermined functions of the horizontal pixel position and which approximate respective horizontal components of the black signal distortion;

a combination accumulation register which accumulates values representing a function of the instantaneous values of said image signal and respective pixel positions corresponding to the instantaneous values as the pixel positions are scanned during both the vertical and horizontal scans to provide a combination accumulated value;

means, responsive only to the combination accumulated value, for generating combination correction signals which change according to third predetermined functions of both the horizontal and vertical pixel positions and which approximate components of the black signal distortion; and means for combining the vertical, horizontal and combination correction signals and the image signal to reduce the dark signal distortion of the image signal.

* * * * *